March 3, 1970 C. A. POPLINSKI 3,498,685

DOVETAIL SLIDE

Filed Jan. 18, 1968

INVENTOR.
CHARLES A. POPLINSKI

BY

JOHN P. CHANDLER

HIS ATTORNEY.

United States Patent Office 3,498,685

Patented Mar. 3, 1970

3,498,685

DOVETAIL SLIDE

Charles A. Poplinski, 79—16 Calamus Ave., Elmhurst, N.Y. 11373

Filed Jan. 18, 1968, Ser. No. 698,952
Int. Cl. F16c *5/00, 17/00, 21/00*
U.S. Cl. 308—3 3 Claims

ABSTRACT OF THE DISCLOSURE

A dovetail slide having a base with a male dovetail member and a slide member with separately formed ways, each having a female dovetail face, and a wear plate with parallel upper and lower faces between the way and the slide, and means securing them along each edge of the slide to permit the ways to be disassembled and their surfaces reground to provide a looser fit, and one face of the wear plate to be ground to provide a closer fit between the sliding parts.

This invention relates to an improved dovetail slide for machine tools and relates more particularly to a novel dovetail slide bearing of simple construction, which can be assembled more quickly than conventional slide and way structures and can be readily adjusted to secure a high degree of precision and also to secure greater or lesser freedom of movement as the moving parts are subjected to wear over a period of time.

In making dovetail slides, it has been the usual practice to form both the male and female dovetail components by casting them or by forming them from extruded stock which requires a considerable amount of handwork, including hand scraping, to secure desired degree of precision in the straight line movement of the parts.

In accordance with the present invention, the dovetail ways are separately formed and have smooth bearing surfaces accurately ground to a precise angle for a true fit during the sliding action.

The horizontal bearing surfaces are hardened and finished bearing plates accurately formed by a planing or milling operation, to which the dovetail ways are secured both by machine screws to hold the flat surfaces in firm face-to-face engagement, and by dowels to secure the parts against any relative surface movement.

A particularly important object of the invention is to provide a dovetail way and slide structure fabricated from separate parts and wherein adjustment to free straight line movement can be quickly and inexpensively achieved and wherein an accurate sliding action is achieved without having to manufacture to fine tolerance.

Figure 1:
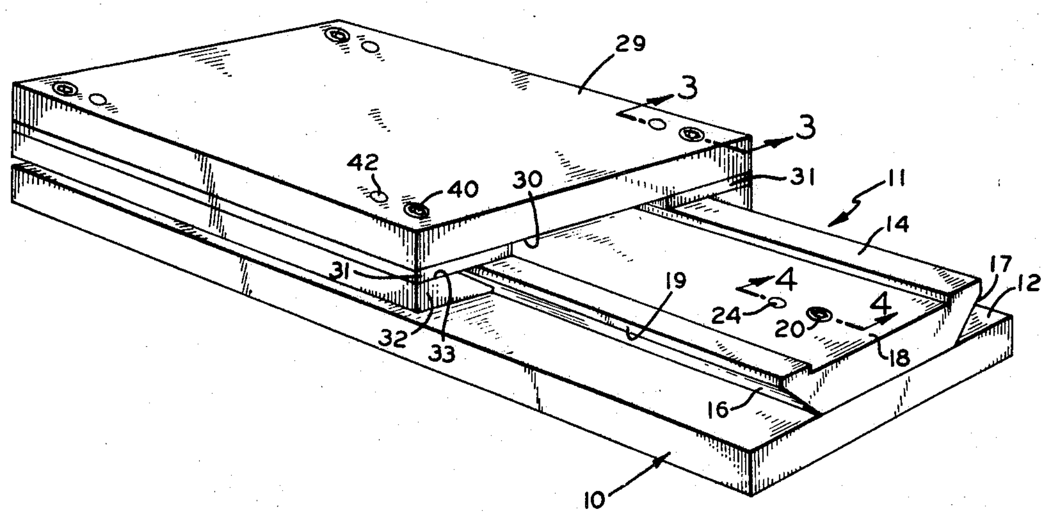
FIG. 1 is a perspective view of a slide embodying the present invention.
Figure 2:
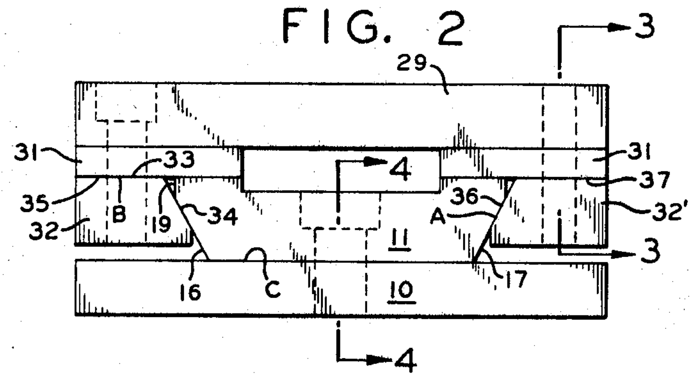
FIG. 2 is an end elevation thereof.
Figure 3:
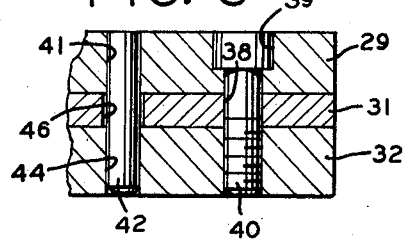
FIG. 3 is a section taken on line 3—3 of FIG. 2.
Figure 4:
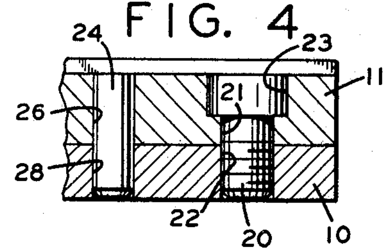
FIG. 4 is a section taken on line 4—4 of FIG. 1.

The base or bed 10 is a flat plate which carries on its upper surface a fixed male dovetail member 11. The base is formed from relatively soft alloy steel with a hardness of 24–25 Rockwell C. Since the upper face 12 of the base does not support any sliding components, the degree of flatness is not too important. The male dovetail member is made from hardened alloy steel and the upper surface 14 is machined to a fine degree of flatness just as are the two opposed diagonal guide surfaces 16 and 17. One guide surface is first precision ground, after which the part is reversed and the second guide surface is finish ground with the same setting, thus assuring that both guide surfaces are inclined at the same angle from the flat top surface 14 over every section thereof. In this fashion, a much higher degree of precision is obtained than if the base and the dovetail member were cast in a single piece and then machined or surface ground. It will be noted that a narrow margin 19 at the juncture of the diagonal surface and the top surface is vertical to allow a slight corner clearance at the roots of the female dovetail member. The upper surface 14 may also have a shallow longitudinal recess 18 to reduce the amount of actual bearing surface, although this is optional.

The male dovetail member 11 is secured in flat surface engagement with the base by means of headed machine screws 20 which pass through holes 21 and 22 in the dovetail member and base, respectively, the latter being threaded and the former has a counterbore 23 to receive the head of the screw. The dovetail member is further secured against relative movement on the surface by dowels 24 passing through holes 26 and 28 in the upper and lower member. The holes in the male dovetail members are drilled before assembly, and after screws 20 are tightened the lower holes 28 are drilled and, if desired, the aligned holes are reamed, after which the dowels are press-fitted into place.

The slide or reciprocating member includes a flat top plate 29 which can be a soft alloy steel like plate 10 and whose lower surface 30 is preferably ground perfectly flat. Relatively narrow wear plates 31 are secured along the opposed margins of this lower surface and below the wears plates are the female dovetail ways 32 and 32'. The inner edges of these wear plates are shown as being generally aligned with the opposed edges of slot 18 in male dovetail member 11. The upper and lower surfaces of the wear plates must be parallel and have a high degree of flatness. The upper surfaces 33 of the dovetail ways must also be flat. The angle between the diagonal surfaces 34 and 36 of the ways and the lower surfaces 35 and 37 of the wear plates must be precisely the same over their entire surfaces as that between diagonal surfaces 16 and 17 of the male dovetail and the upper surface 12 of the base 10. This can be achieved by again using the same angular setting on the grinding machine.

The top plate, wear plates and dovetail ways are secured together in the same manner as earlier described with respect to the fixed base component. Aligned holes 38 are first drilled in the three members with an enlarged portion 39 in the top plate to receive the heads of the machine screws 40. The machine screws secure the plate in firm face-to-face engagement against separation. Precision positioning of the ways and wear plates are first attained on one side and then on the other. Operating first, for instance, on the left-hand side, dowel hole 44 is pre-drilled in the guide plate 32. Dowel hole 46 in the wear plate 31 is also pre-drilled and this hole is slightly larger than hole 46 since precise positioning of the wear plate is not critical. It is the upper and lower surfaces which are important. Dowel hole 41 is finally drilled and the dowel 42 forced into the aligned holes. The dowels have tapered leading ends which facilitate assembly.

The next step is to assemble the components on the right side. Dowel holes 44 and 46 have been predrilled. Screws 40 are partially tightened and the slide applied to the base. The surface 36 of right dovetail way 32' is moved against surface 17 of the male dovetail until a trial fit is secured. If too much pressure is applied at this time, the sliding member will simply not slide. If too loose, that fact will also be apparent. After the initial adjustment is completed and the machine screws tightened, the sliding member is removed from the base and the aligned dowel holes drilled in the top plate, as earlier described, the holes reamed if necessary and the dowels 42 inserted. The reaming may be dispensed with if split pins are used rather than solid dowels. It will be understood that the one of the dowels between the male slide and the base plate 10 is of less importance than it is in the slide assembly. There is always some clearance between a machine screw and its supporting hole and some travel can always be expected which might be undesirable in the base support for the slide assembly.

When the latter are assembled by the method just described, the slide assembly will have a long period of life without any side play. When such play eventually develops, the trouble is quickly remedied by disassembling the slide assembly and then removing a thin layer of material from the upper faces 33 of the ways 32 and 32'. Similarly, if the fit should, for any reason, become too tight for free sliding movement, a thin layer of material can be removed from faces 34 and 36 of the dovetail ways. These sliding surfaces, indicated at A, are wear surfaces and must be refinished from time to time whereas the surfaces in area B have no wear, although the inner margin of wear plate 31 suffer considerable wear.

If for some reason, it is required to move the center line of the slide to the right or to the left, the dovetail ways 32 and 32' can be disassembled, new dowel holes drilled and the parts re-assembled as done initially. Also, the female slide can be raised or lowered by increasing or decreasing the thickness of the wear plates. Similarly, if the plane of the dovetail slide 29 must be lowered or raised, the surface in area C may be operated upon.

The principal advantage in the present arrangement is that as the dovetail elements become worn, the appropriate surface can be re-worked or re-ground by disassemblying the parts and then performing the grinding operation. The parts are then re-assembled and the looseness has been removed. If the members do not slide freely enough, the condition can be relieved by grinding other surfaces. Any of these grinding operations are performed on flat surfaces with no flanges along the edges to interfere with the grinding operation.

While there have been described herein what are at present considered preferred embodiments of the invention, it will be obvious to those skilled in the art that many modifications and changes may be made therein without departing from the essence of the invention. It is, therefore, to be understood that the exemplary embodiments are illustrative and not restrictive of the invention, the scope of which is defined in the appended claims, and that all modifications that come within the meaning and range of equivalency of the claims are intended to be included therein.

What is claimed is:

1. A slide assembly for a machine tool and comprising a base plate and a sliding plate carried thereby, each carrying dovetail elements on their adjoining faces including a male dovetail member with opposed dovetail faces carried in fixed relation on the one of said plates, and a pair of members carried along opposed edges of the sliding plate, one of said members being a way with a female dovetail face which engages in flat relation one dovetail face of the male dovetail member, and a wear plate with parallel upper and lower faces between the way and the sliding plate, the lower face of the wear plate engaging along its inner margin the adjoining upper face of the male dovetail member, the other margin of said wear plate engaging in fixed relation the upper face of the female dovetail way, screws passing through said members and the sliding plate, securing them together in firm surface contact, said three members having holes generally aligned to receive the screws, and a plurality of other aligned holes in said members, and dowels passing through said latter aligned holes for preventing relative surface movement of the plates, said plates being disassembled by the removal of the screws and dowels to permit a dovetail surface of the female way plate to be re-ground to provide a relatively looser fit between the sliding parts, and one of said surfaces of the female way plate to be re-ground to provide a closer fit, said dovetail members being formed from hardened steel and the plates from softer steel.

2. The structure of claim 1 wherein the male dovetail member is removably secured to the base by screws and dowels to permit the lower face thereof to be relieved or to be moved laterally to an adjusted fixed position.

3. The structure of claim 1 wherein the dovetail faces of the male member and of the ways are each disposed at the same angle to the adjoining faces of their supporting plates.

References Cited

UNITED STATES PATENTS

| | | | |
|---|---|---|---|
| 649,548 | 5/1900 | Reardon | 308—3 |
| 1,009,376 | 11/1911 | Bayles | 308—3 |
| 1,397,696 | 11/1921 | Nelson. | |
| 1,831,445 | 11/1931 | Hansen | 308—3 |
| 2,167,609 | 7/1939 | Dolle. | |
| 2,195,841 | 4/1940 | Schlitters. | |
| 2,378,343 | 6/1945 | Walter. | |
| 2,479,653 | 8/1949 | Walter. | |
| 2,506,958 | 5/1950 | Hallenbeck. | |
| 2,581,602 | 1/1952 | Pulsifer. | |
| 2,844,416 | 7/1958 | Zaveruha. | |
| 2,888,300 | 5/1959 | Curtis | 308—3 |
| 3,095,247 | 6/1963 | Zelewsky | 308—3 |

MARTIN P. SCHWADRON, Primary Examiner

L. L. JOHNSON, Assistant Examiner